United States Patent
Sassolini et al.

(10) Patent No.: US 6,501,623 B1
(45) Date of Patent: Dec. 31, 2002

(54) METHOD FOR ASSEMBLING AN ACTUATOR DEVICE FOR A HARD DISK, COMPRISING A READ/WRITE TRANSDUCER, A MICROACTUATOR, AND A SUSPENSION, AND THE ACTUATOR DEVICE THUS OBTAINED

(75) Inventors: Simone Sassolini, Sansepolcro (IT); Sarah Zerbini, Fontanellato (IT); Benedetto Vigna, Potenza (IT); Ubaldo Mastromatteo, Cornaredo (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 0 days.

(21) Appl. No.: 09/357,078

(22) Filed: Jul. 20, 1999

(30) Foreign Application Priority Data

Jul. 30, 1998 (EP) .............................. 98830465

(51) Int. Cl.⁷ ................................ G11B 5/55
(52) U.S. Cl. ................ 360/245.3; 360/234.6; 360/245.2; 360/294.1
(58) Field of Search ............. 360/246.7, 245.8, 360/245.9, 294.1–294.7, 264.5, 245.2, 245, 245.3, 234.6, 245.4

(56) References Cited

U.S. PATENT DOCUMENTS

| | | | |
|---|---|---|---|
| 3,789,378 A | 1/1974 | Bonzano et al. | 340/174.1 |
| 4,065,677 A | 12/1977 | Micheron et al. | 307/112 |
| 5,025,346 A | 6/1991 | Tang et al. | 361/283 |
| 5,151,763 A | 9/1992 | Marek et al. | 357/26 |
| 5,216,631 A | 6/1993 | Sliwa, Jr. | 365/174 |
| 5,233,213 A | 8/1993 | Marek | 257/415 |
| 5,331,489 A | * 7/1994 | Johnson et al. | 360/234.5 |
| 5,428,259 A | 6/1995 | Suzuki | 310/309 |
| 5,438,469 A | 8/1995 | Rudi | 360/109 |
| 5,477,097 A | 12/1995 | Matsumoto | 310/309 |

(List continued on next page.)

FOREIGN PATENT DOCUMENTS

| | | |
|---|---|---|
| EP | 0 482 205 A1 | 4/1992 |
| EP | 0 533 095 A2 | 3/1993 |

(List continued on next page.)

OTHER PUBLICATIONS

Tang et al., "Laterally Driven Polysilicon Resonant Microstructures," *Sensors and Actuators*. (20):25–32, Nov. 15, 1989.

Starr, "Squeeze–Film Damping in Solid–State Accelerometers," *IEEE Solid–State Sensor an Actuator Workshop*, pp. 44–47, Jun. 1990.

(List continued on next page.)

Primary Examiner—Brian E. Miller
(74) Attorney, Agent, or Firm—Lisa K. Jorgenson; Robert Iannucci Seed IP Law Group PLLC

(57) ABSTRACT

A microactuator is attached to a first face of a coupling formed on a suspension, so that an R/W transducer projects from an opposite face. A hole in the coupling permits passage of an adhesive mass interposed between a rotor of the microactuator and the R/W transducer. A strip of adhesive material extends between a die accommodating the microactuator and the coupling, and externally surrounds the microactuator. The coupling acts as a protective shield for the microactuator, both mechanically and electrically. The coupling covers the microactuator at the front, and prevents foreign particles from blocking the microactuator. In addition, the coupling electrically insulates the R/W transducer, which is sensitive to magnetic fields, from regions of the microactuator biased to a high voltage. With the coupling, the strip forms a sealing structure, which in practice surrounds the microactuator on all sides.

12 Claims, 7 Drawing Sheets

U.S. PATENT DOCUMENTS

| | | | | |
|---|---|---|---|---|
| 5,521,778 | A | | 5/1996 | Boutaghou et al. .......... 360/106 |
| 5,631,514 | A | | 5/1997 | Garcia et al. ................ 310/309 |
| 5,657,188 | A | | 8/1997 | Jurgenson et al. ........... 360/106 |
| 5,850,320 | A | * | 12/1998 | Warmka et al. ........... 360/234.5 |
| 5,862,016 | A | * | 1/1999 | Sakurai et al. ............... 360/123 |
| 5,867,347 | A | * | 2/1999 | Knight et al. ................ 360/104 |
| 5,959,808 | A | * | 9/1999 | Fan et al. .................... 360/106 |
| 5,962,017 | A | * | 10/1999 | Hauer et al. ................. 424/400 |
| 6,069,771 | A | * | 5/2000 | Boutaghou et al. .......... 360/104 |
| 6,122,149 | A | * | 9/2000 | Zhang et al. ............. 360/294.5 |
| 6,215,629 | B1 | * | 4/2001 | Kant et al. ................... 360/290 |
| 6,222,706 | B1 | * | 4/2001 | Stefansky et al. ........ 360/294.5 |
| 6,349,017 | B1 | * | 2/2002 | Schott ...................... 360/234.5 |

FOREIGN PATENT DOCUMENTS

| | | | |
|---|---|---|---|
| EP | 0 578 228 A3 | | 1/1994 |
| EP | 0 578 228 A2 | | 1/1994 |
| EP | 0 613 124 A2 | | 8/1994 |
| EP | 0 840 291 A2 | | 5/1998 |
| JP | 7-177773 | | 7/1995 |
| JP | WO 98/19304 | * | 5/1998 |
| WO | WO 93/21536 | | 10/1993 |
| WO | WO 95/34943 | | 12/1995 |

OTHER PUBLICATIONS

Gianchandani et al., "Batch Fabrication and Assembly of Micromotor–Driven Menchanisms With Multi–Level Linkages," *Mirco Electro Mechanical Systems*, IEEE, pp. 141–146, 1992.

Lee et al., "Polysilicon Micro Vibromotors," *Micro Electro Mechanical Systems*, IEEE, pp. 177–182, Feb. 4–7, 1992.

Fujita et al., "Position Control of an Electrostatic Linear Actuator Using Rolling Motion," *Mechatronics*, vol. 2, No. 5, pp. 495–502, Oct. 1992.

Zhang et al., "Viscous Air Damping in Laterally Driven Microresonators," *IEEE Workshop No. 7*, pp. 199–204, Jan. 25, 1994.

Fan et al., "Magnetic Recording Head Positioning at Very High Track Densities Using a Microactuator–Based, Two–Stage Servo System," *Transactions on Industrial Electronics*, IEEE, 42(3):222–233, Jun. 1995.

Moesner et al, "Electrostatic Devices for Particle Micro–Handling," *IEEE*, pp. 1302–1309, 1995.

Imamura et al., "Transverse Mode Electrostatic Microactuator For MEMS–Based HDD Slider," *IEEE*, pp. 216–221, 1996.

Horsley et al., "Angular Micropositioner For Disk Drives," *IEEE MEMS '97 Workshop* Nagoya, Japan.

Veijola et al., "Model for Gas Film Damping in a Silicon Accelerometer," *1997 International Conference on Solid–State Sensors and Actuators*, pp. 1097–1100, Jun. 16–19, 1997.

Pannu et al., "Accelerometer Feedforward Servo For Disk Drives." Presented at the *Advanced Intelligent Mechatronics–International Conference*, Tokyo, Japan, Jun. 1997.

Aggarwal, "Design and Control of Micro–Actuators for High Density Disk Drives," *Thesis Graduate Division— University of California at Berkeley*, May 1997.

Aggarwal et al., "Micro–Actuators for High Density Disk Drives," *American Control Conference*, 1997.

Peter Mee et al, "Only Clean Drives Are Good Drives," *Data Storage*, pp. 77–80, Sep., 1997.

* cited by examiner

METHOD FOR ASSEMBLING AN ACTUATOR DEVICE FOR A HARD DISK, COMPRISING A READ/WRITE TRANSDUCER, A MICROACTUATOR, AND A SUSPENSION, AND THE ACTUATOR DEVICE THUS OBTAINED

TECHNICAL FIELD

The present invention relates to a method for assembling an actuator device for a hard disk, the actuator comprising a read/write transducer, a microactuator, and a suspension, and the actuator device obtained using the method.

BACKGROUND OF THE INVENTION

As is known, an actuator device for a hard disk recently has been proposed. The actuator device is provided with a double actuation stage to finely control a position of a read/write head with respect to the hard disk to be read or written. An example of a known actuator device 1 with a double actuation stage is shown schematically in FIGS. 1 and 2. In detail, in FIG. 1, the actuator device 1 for a hard disk 7 comprises a motor 2 (also called a "voice coil motor"), to which at least one suspension 5 formed by a lamina is fixed in a projecting manner. At its free end, the suspension 5 supports a read/write (R/W) transducer 6 (see, e.g., FIG. 2) (also known as a "slider") which in an operative condition, is disposed facing a surface of the hard disk 7 (see, e.g., FIG. 1). The R/W transducer 6 is rigidly connected to a coupling (called a "gimbal" 8), through a microactuator 9 interposed between the gimbal 8 and the R/W transducer 6. On one of its lateral surfaces, the R/W transducer 6, formed by a ceramic material body (e.g., AlTiC), further has a read/write head 10 (which is magneto/resistive and inductive) which forms the actual read/write device.

In the actuator device 1, a first actuation stage is formed by the motor 2 that moves an assembly formed by the suspension 5 and the R/W transducer 6 across the hard disk 7 during track seeking, and a second actuation stage is formed by the microactuator 9 that finely controls a position of the R/W transducer 6 during tracking.

An embodiment of the microactuator 9 of a rotary electrostatic type is shown in diagrammatic form in FIG. 3, wherein the microactuator 9 is shown only in part, given its axial symmetry. The microactuator 9 comprises a stator 17 integral with a die accommodating the microactuator 9 and bonded to the gimbal 8, and a rotor 11 intended to be bonded to the R/W transducer 6 and capacitively coupled to the stator 17.

The rotor 11 comprises a suspended mass 12 of a substantially circular shape and a plurality of movable arms 13 extending radially towards the outside from the suspended mass 12. Each movable arm 13 has a plurality of movable electrodes 14 extending in a substantially circumferential direction and spaced at a same distance from each other. The rotor 11 further comprises anchoring and elastic suspension elements (shown as springs 15) for supporting and biasing the rotor 11 through fixed regions 16.

The stator 17 comprises a plurality of fixed arms 18a, 18b extending radially and each bearing a plurality of fixed electrodes 19. In particular, associated with each movable arm 13 is a pair of fixed arms formed by the fixed arm 18a and the fixed arm 18b. The fixed electrodes 19 of each pair of fixed arms 18a, 18b extend towards the associated movable arm 13 and are intercalated or interleaved with the movable electrodes 14. The fixed arms 18a are all disposed on a same side of the respective movable arms 13 (on the right side in the example shown in FIG. 3) and are all polarized at a same potential via biasing regions 20a. Similarly, the fixed arms 18b are all disposed on the other side of the respective movable arms 13 (on the left side in the example shown in FIG. 3) and are all biased at a same potential through biasing regions 20b. The fixed arms 18a and 18b are biased at different potentials to generate two different potential differences with respect to the movable arms 13 and to cause the rotor to rotate in one direction or the other.

In the assembly of FIG. 2, there is a problem that the microactuator 9 is exposed to an external environment, and is therefore not protected against dielectric particles that can prevent the microactuator 9 from functioning satisfactorily. In addition, in the actuator device 1, electrostatic interference may arise between a high voltage (of approximately 80 V) used for the actuation and the read/write head 10, thus preventing, or at least jeopardizing, satisfactory functioning of the read/write head 10.

SUMMARY OF THE INVENTION

An advantage of the invention is to provide an actuator device that addresses the problems described above currently affect known devices.

According to embodiments of the present invention, a method is provided for assembling an actuator device for a hard disk, the actuator device comprising a read/write (R/W) transducer, a microactuator, and a suspension plate.

The method comprises connecting the microactuator to a first face of the suspension plate and projecting the R/W transducer from a second face of the suspension plate opposite to the first face. The connecting comprises placing a strip of adhesive material between a body accommodating the microactuator and the suspension plate and activating the strip.

In an embodiment of the invention, the suspension plate has a through-hole having a larger size than the R/W transducer. Before the connecting the microactuator to the first face of the suspension plate, the method further comprises assembling the R/W transducer to the microactuator and inserting the R/W transducer in the through-hole.

BRIEF DESCRIPTION OF THE DRAWINGS

To help understand the present invention, two illustrative embodiments are now described, purely by way of non-exhaustive and non-limiting examples, with reference to the attached drawings.

DETAILED DESCRIPTION OF THE ILLUSTRATED EMBODIMENTS

Figure 1:
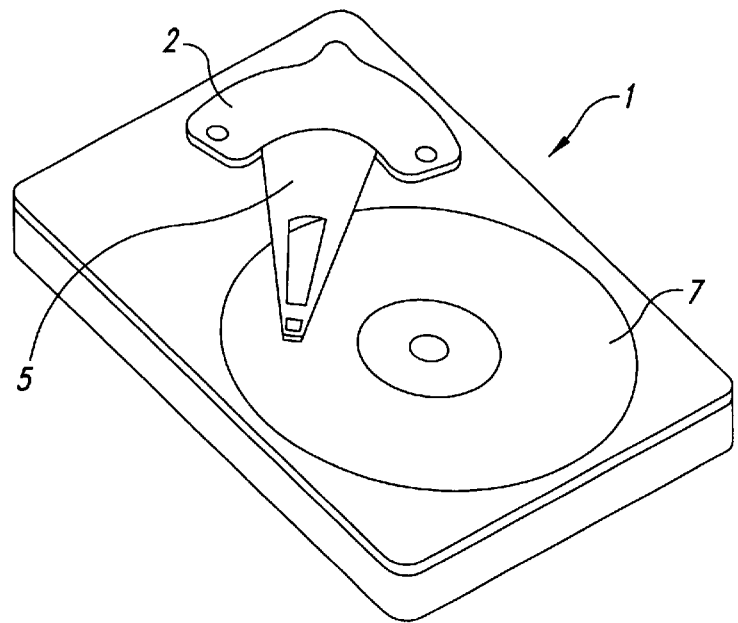
FIG. 1 shows a perspective view of a known type of an actuator device for hard disks.
Figure 2:
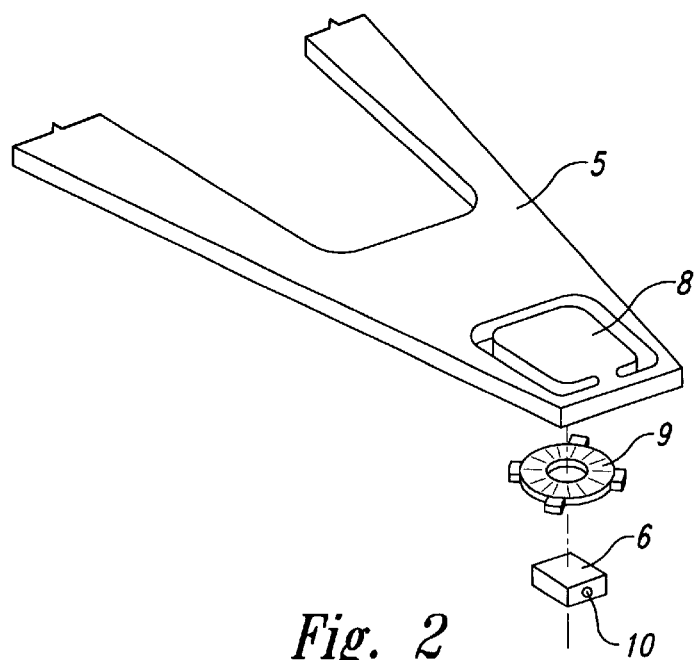
FIG. 2 shows an exploded view of a micrometric actuation unit for the actuator device of FIG. 1.
Figure 3:
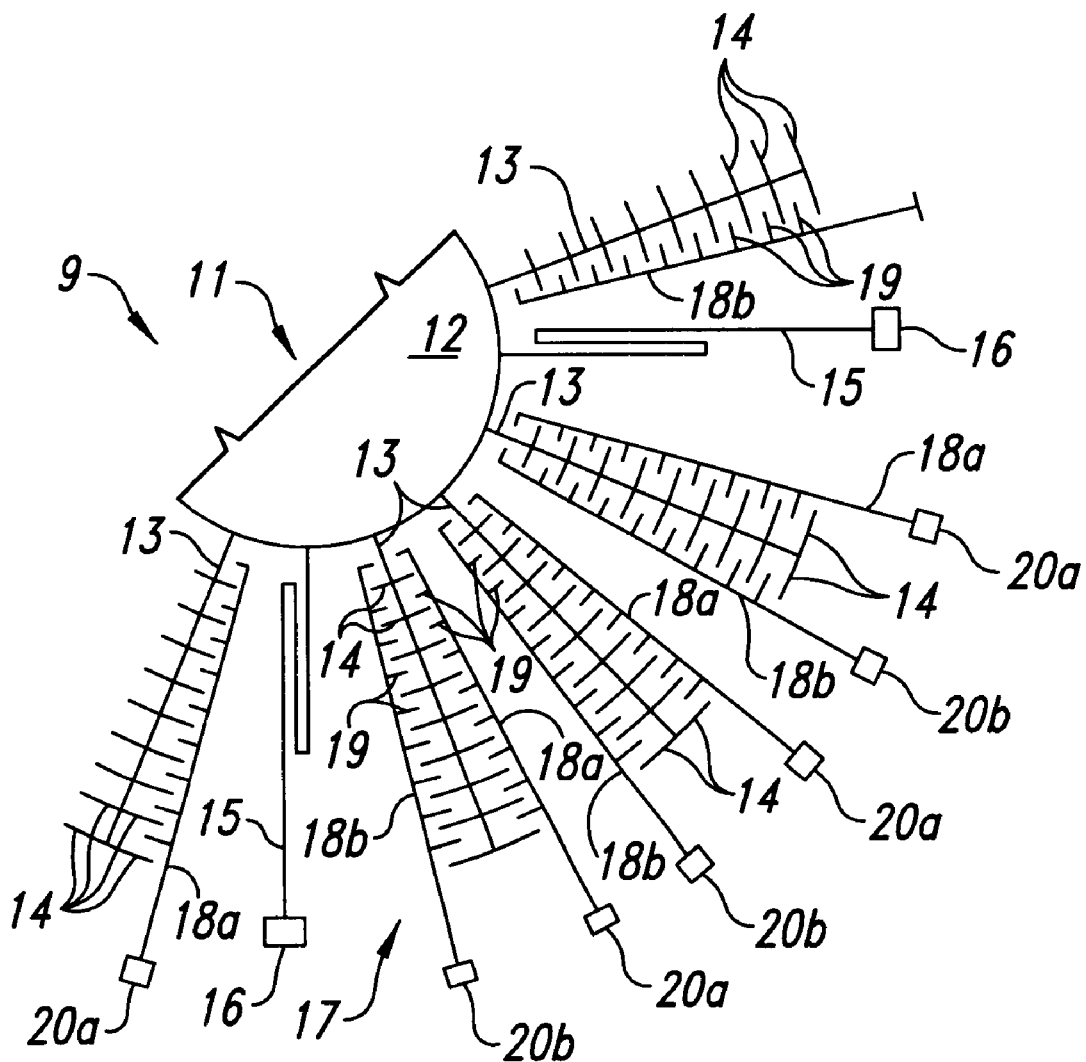
FIG. 3 shows a schematic representation of a rotary-type microactuator.
Figure 4:
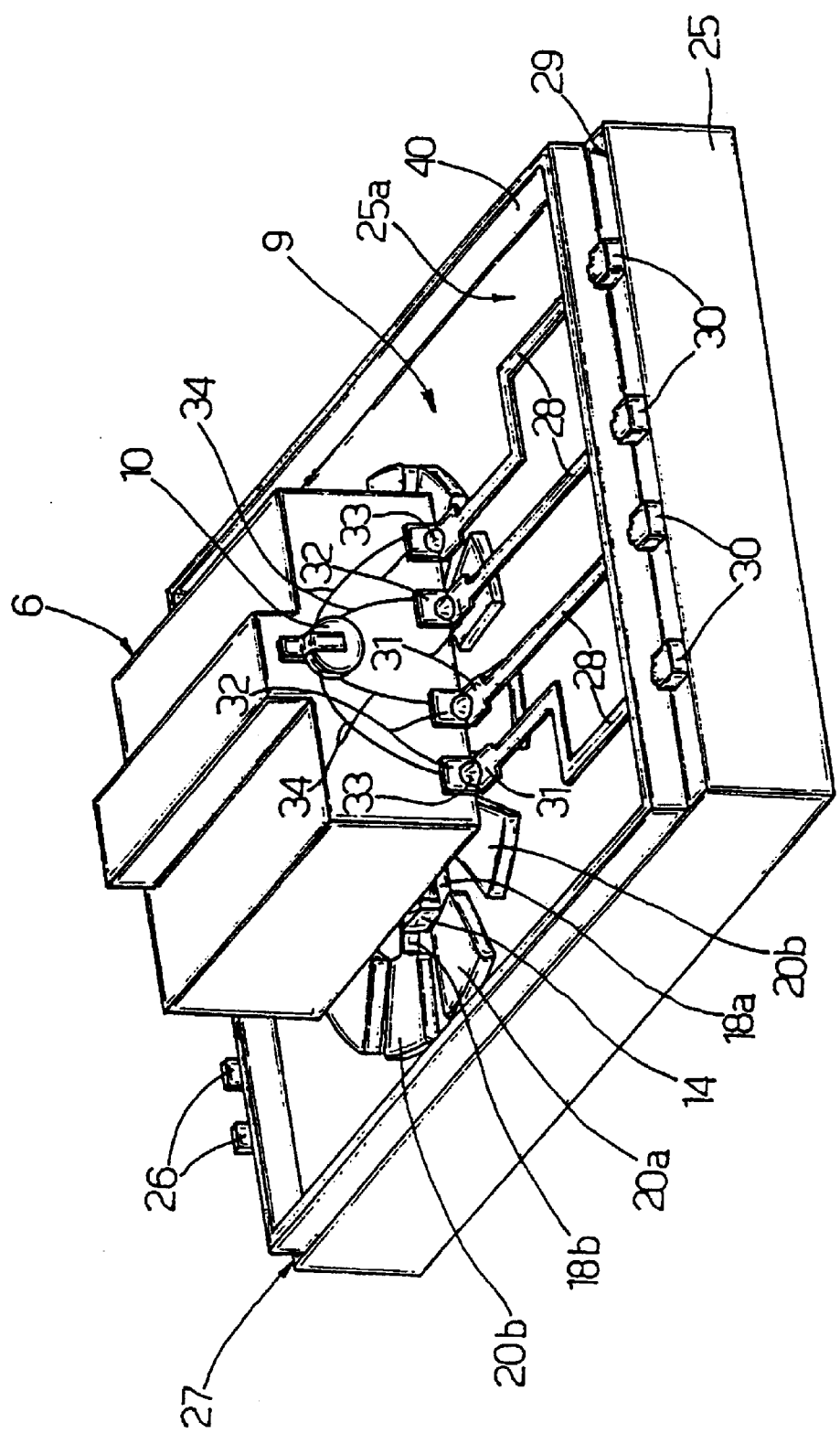
FIG. 4 shows a perspective view of an assembly formed by a microactuator and head according to a first embodiment of an assembly method of the present invention, before being glued to a suspension.

FIG. 4 shows an assembly comprising a microactuator 9 and a R/W transducer 6, before being glued to the gimbal 8, according to a first embodiment of an assembly method of the present invention. In the following description, parts common to FIGS. 1–3 are indicated with the same reference numbers, unless otherwise indicated.

FIG. 4 shows a die 25 accommodating the microactuator 9, with the rotor 11 already connected to the R/W transducer 6. As is known, at this stage, the R/W transducer 6 does not completely cover the microactuator 9, but considerable parts of the latter remain exposed. The microactuator 9 is manufactured in a known manner, as shown schematically in FIG. 3 and previously described above. In particular, FIG. 4 shows some of the biasing regions 20a and 20b, part of the respective fixed arms 18a and 18b, and a movable electrode 14 arranged at the end of a movable arm 13 (not shown). The R/W transducer 6 is fixed to the suspended mass 12 of the rotor 11, in a manner described hereinafter with reference to FIG. 6. The die 25 has an upper surface 25a of rectangular shape, facing the microactuator 9, and on which electrical connection and securing structures are formed for the gimbal 8. In detail, first contact pads 26 are formed near a first short side 27 of the upper surface 25a, for electrically connecting components accommodated in the die 25 (including the microactuator 9) to an external control unit (not shown), as explained in detail hereinafter. In addition, electrical connection regions 28 extend between the R/W transducer 6 and a second short side 29, opposite to the first short side 27 of upper surface 25a.

The electrical connection regions 28 are suspended, in order to allow rotation of the R/W transducer 6 during actuation, and are produced at the end of the manufacturing steps of the microactuator 9. For example, the electrical connection regions 28 are produced by depositing metal material on a sacrificial layer, defining the metal material, and then removing the sacrificial layer, as described in detail in European Patent Application No. 98830269.1, filed May 5, 1998 in the name of the assignee of the present invention and incorporated herein by reference. Alternatively, the electrical connection regions 28 can be grown galvanically, using sacrificial regions that also act as a shaping mask.

On the second short side 29, the electrical connection regions 28 form second contact pads 30 for connection to the external control unit (not shown), as explained in detail hereinafter. At the R/W transducer 6, the electrical connection regions 28 form connection portions 31 joined to third contact pads 32, which are formed on the R/W transducer 6 by ball bonding, using balls 33 of conductive material (for example, gold, gold alloys, or tinned lead). The third contact pads 32 are connected to the head 10 by connection elements 34.

Figure 5:
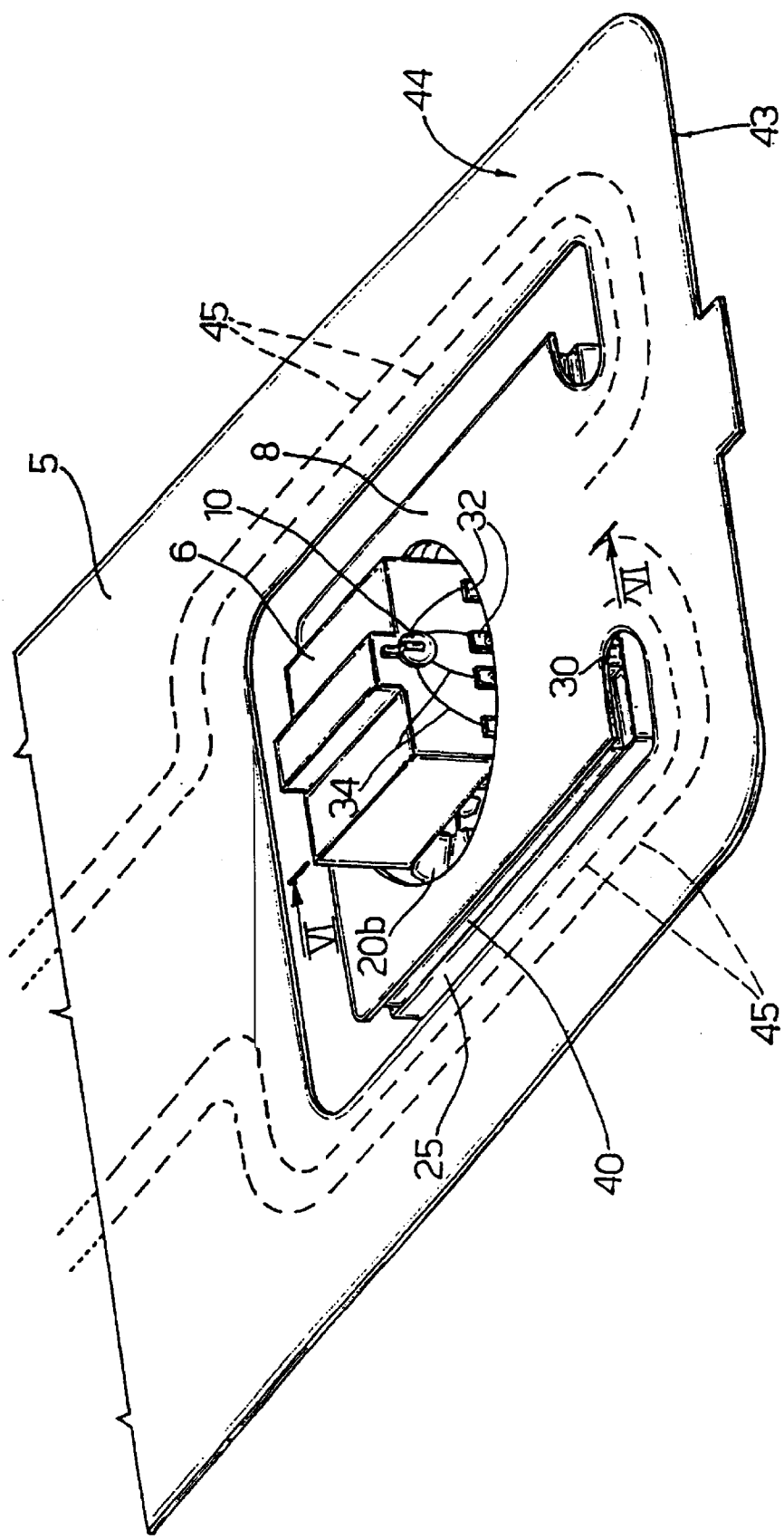
FIG. 5 shows a perspective view of the assembly of FIG. 4 after being glued to the suspension.
Figure 6A:
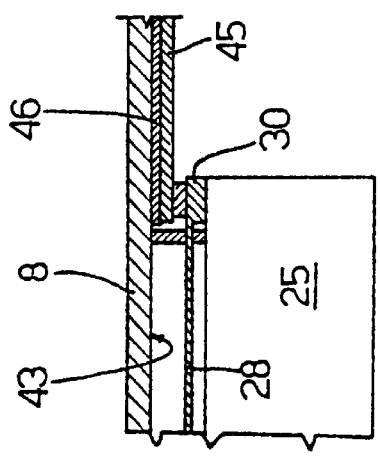
FIG. 6a shows a detail view of a variation of the assembly shown in FIG. 6.
Figure 6B:
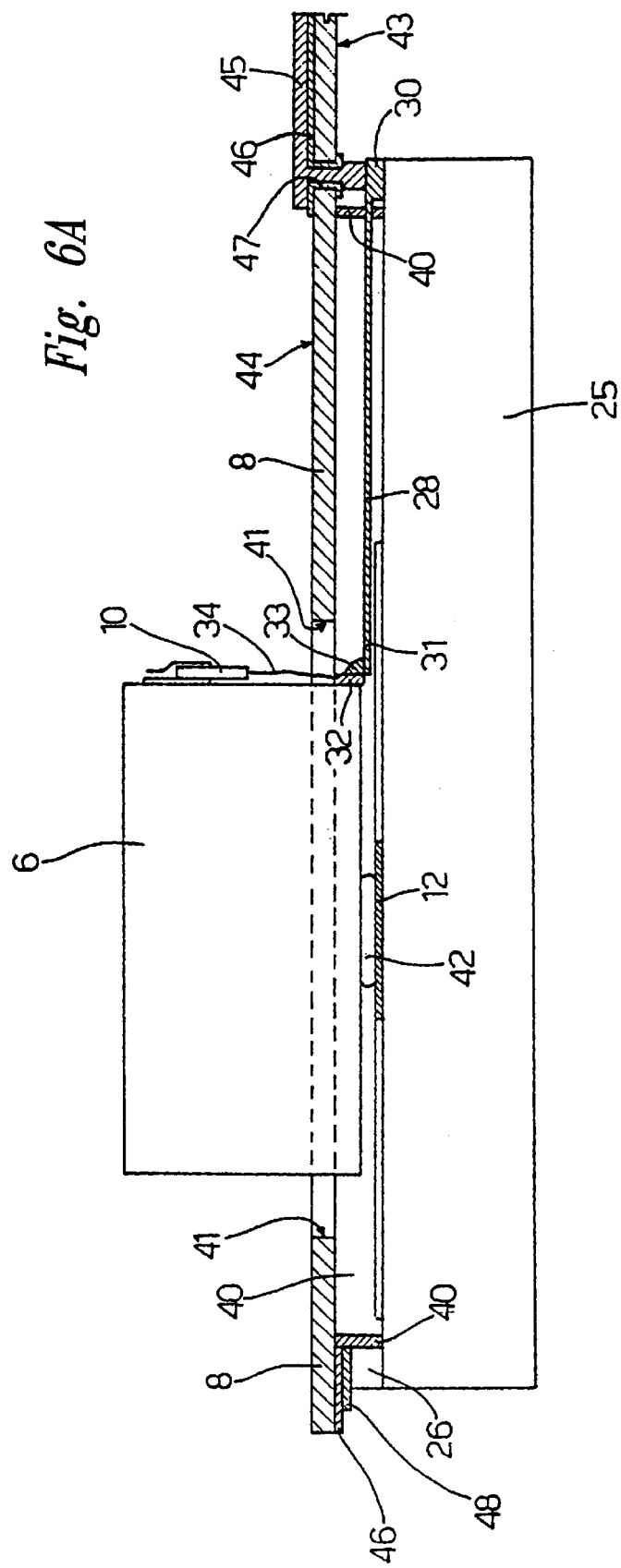
FIG. 6 shows a cross-sectional view taken along a line VI—VI of the assembly of FIG. 5.

A strip 40 of adhesive material extends near the sides of the surface 25a of the die 25, for gluing to the gimbal 8, as shown in detail in FIGS. 5 and 6.

FIGS. 5 and 6 show the assembly comprising the gimbal 8, the R/W transducer 6, and the die 25, in a final assembled condition. As can be seen, the gimbal 8 (forming a suspension lamina) has a first face 43 facing the die 25, and a second face 44, opposite to the first face 43, from which the R/W transducer 6 projects. The gimbal 8 is provided with a central circular hole 41, of sufficient dimensions to allow passage of the R/W transducer 6, which is already glued to the rotor 11, as can be seen in particular in the cross-sectional view of FIG. 6. FIG. 6 also shows an adhesive material mass 42 arranged between the suspended mass 12 and the R/W transducer 6. The strip 40 now adheres to the first face 43 of the gimbal 8. Thus the die 25 having the R/W transducer 6 glued to it is rigidly connected to the gimbal 8. Both the mass 42 and the strip 40 can be formed of a polymer material curable by ultraviolet (UV) rays or by application of heat.

The gimbal 8 and the suspension 5 (see, e.g., FIG. 2) have, on both of their faces, conductive tracks for electrical connection to the external control unit (not shown). In particular, on the second face 44 of the gimbal 8 and of the suspension 5, conductive tracks 45 are provided (shown only schematically by broken lines in FIG. 5), which are insulated with respect to the gimbal 8 and to the suspension 5 by an insulating material layer 46 (see, e.g., FIG. 6). The conductive tracks 45 are connected electrically to the second contact pads 30 via holes 47 formed in the gimbal 8. On the other hand, the first contact pads 26 (and the components formed in the die 25) are connected to the external control unit (not shown) by conductive tracks 48 (only a portion whereof can be seen in FIG. 6), which extend on the first face 43 of the gimbal 8 and the suspension 5, and are also insulated with respect to the gimbal 8 and the suspension 5 by the insulating layer 46.

The die 25 and the R/W transducer 6 are assembled to the gimbal 8 as follows and in reference to FIGS. 4–6. Initially, after forming the microactuator 9 in, or on, a semiconductor material wafer, the electrical connection regions 28 and the first and second contact pads 26, 30 are formed, for example as described above. The R/W transducer 6 is glued to the suspended mass 12 (after the mass 42 has been deposited and cured). The semiconductor material wafer is then cut into the individual dices 25. Subsequently, the connection portions 31 are electrically connected to the third contact pads 32 by the balls 33, thus obtaining the assembly of FIG. 4. The strip 40 is then formed. The assembly, including the die 25 and the R/W transducer 6, is arranged in contact with the gimbal 8 (which is already provided with the conductive tracks 45, 48), and the strip 40 is activated (cured) by UV or by heat. In this step, the first and second contact pads 26, 30 are also soldered to the respective conductive tracks 48, 45.

FIG. 6a shows a variant of the assembly of FIG. 6, wherein the conductive tracks 45 are formed on the first face 43 of the gimbal 8 and the suspension 5. Indeed, in FIG. 6a, the conductive tracks 45 and the conductive tracks 48 extend adjacent to one another, insulated with respect to the gimbal 8 and the suspension 5 by the insulating material layer 46.

Figure 7:
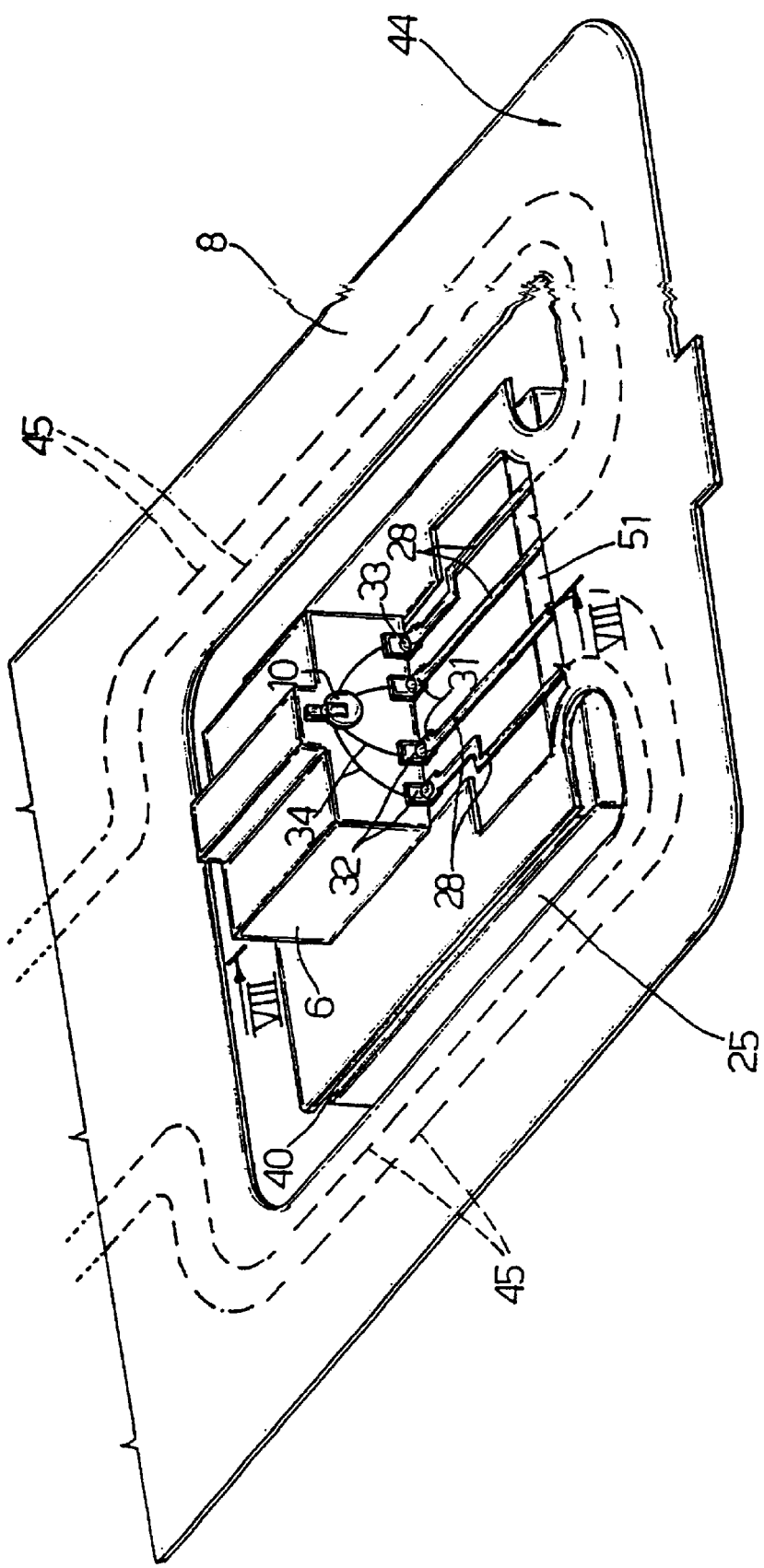
FIG. 7 shows a perspective view of an assembly formed by a microactuator, a head and a suspension, according to a second embodiment of a method of the present invention, after being glued to the suspension.
Figure 8:
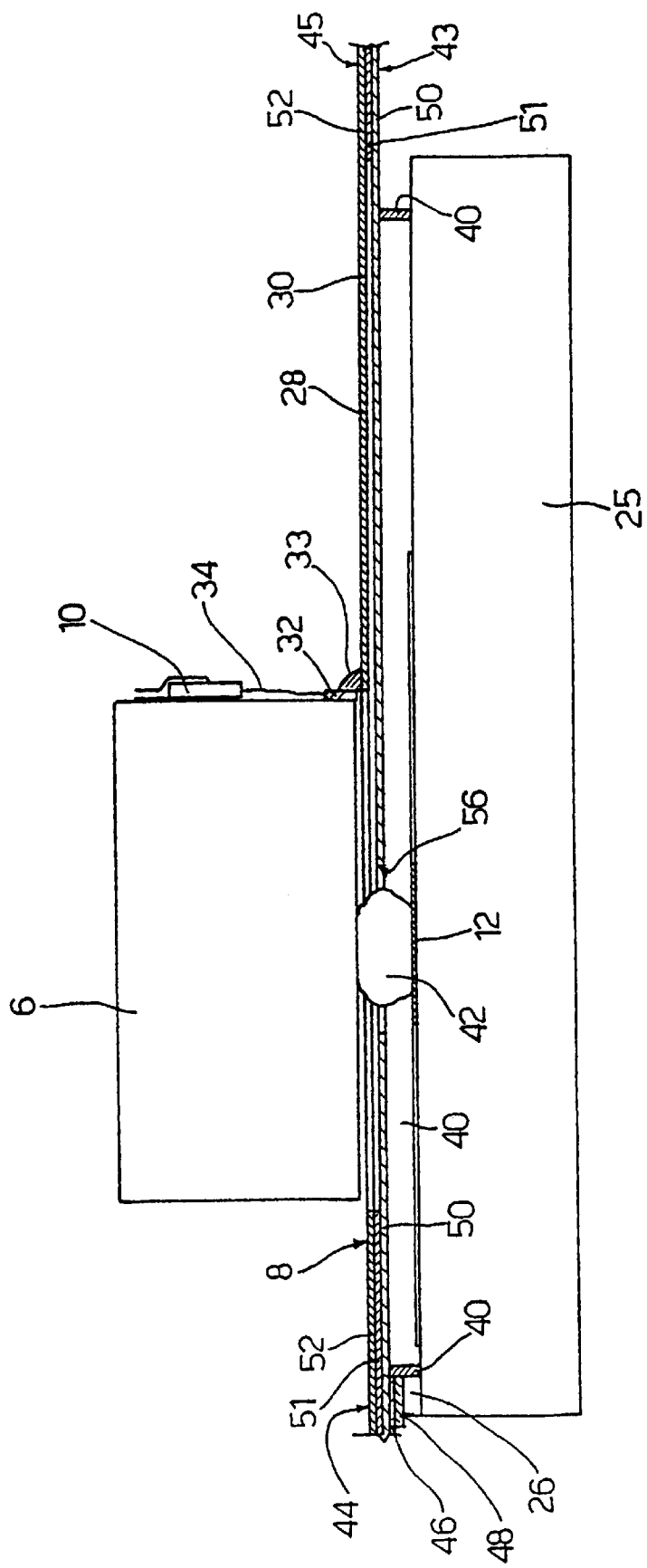
FIG. 8 shows a cross-sectional view taken along a line VIII—VIII of FIG. 7.

In a second embodiment of the invention shown in FIGS. 7 and 8, the gimbal 8 is interposed between the R/W transducer 6 and the die 25, before gluing them together. In addition, the electrical connection regions 28 and the conductive tracks 45 are formed directly from the material of the gimbal 8. Indeed, as shown in detail in the cross-sectional view of in FIG. 8, the gimbal 8 is generally formed by three superimposed layers, comprising a steel plate 50, an insulating material 51 (for example, polyimide), and a conductive layer 52 (for example, copper). In FIGS. 7 and 8, for forming the electrical connection regions 28 and the conductive tracks 45 and before the gimbal 8 is glued to the die 25 and the R/W transducer 6, the insulating material 51 is completely removed in an area below the R/W transducer 6 and in an adjacent area, where the electrical connection regions 28 are to be formed (see, e.g., FIG. 8). In addition, the conductive layer 52 is completely removed in the area below the R/W transducer 6, and is removed selectively in the adjacent area and along the entire gimbal 8 and the suspension 5, so that portions remaining form the electrical connection regions 28 and the conductive tracks 45. In other words, the electrical connection regions 28 and the conductive tracks 45 are formed from the conductive layer 52 of the gimbal 8, and the second contact pads 30 are not present.

In FIG. 8, the steel plate 50 has a hole 56 at the suspended mass 12 of the rotor 11. At the hole 56, the insulating material 51 and the conductive layer 52 are removed, as explained above. Advantageously, the hole 56 has much smaller dimensions than the central circular hole 41 in FIG. 6, since the hole 56 allows application of the suspended mass 42 alone.

The die 25 and the R/W transducer 6 are assembled to the gimbal 8 as follows and according to FIGS. 7 and 8. Initially, after forming the microactuator 9 in, or on, a semiconductor material wafer, cutting into the dice 25, and forming the electrical connection regions 28 and the conductive tracks 45, 48 on the gimbal 8, the strip 40 and the mass 42 are deposited. The die 25 is arranged against the first face 43, and the R/W transducer 6 is arranged against the second face 44 of the gimbal 8. The strip 40 and the mass 42 are then cured by UV or by heat. In addition, the first contact pads 26 are soldered to the conductive tracks 48. Subsequently, the connection portions 31 are electrically connected to the third contact pads 32 by the balls 33.

Advantages of the described assembly include the following. First, the gimbal 8 acts as a protective shield for the microactuator 9, both from mechanical and electrical points of view. Indeed, the gimbal 8 covers the microactuator 9 at the front, particularly in the second embodiment in FIGS. 7 and 8, wherein the hole 56 has very small dimensions—smaller than the area of the R/W transducer 6 (see in particular FIG. 7, in which the microactuator 9 can no longer be seen). The gimbal 8 thus prevents dielectric particles or ions from falling or being attracted into the microactuator 9, and therefore, prevents the microactuator 9 from being blocked. The strip 40, laterally surrounding the microactuator 9 and made of a dielectric material, also contributes to shielding. Consequently, in practice, the microactuator 9 is surrounded on all sides by a sealing structure which virtually insulates it from the exterior.

In addition, the gimbal 8 acts as an electrostatic screen, by virtue of the steel plate 50 (and optionally with the conductive layer 52, if any) electrically separating the R/W transducer 6 from high-voltage biased regions (e.g., the stator 17 biased with voltages close to 80 V) which could generate magnetic noise fields for the R/W transducer 6.

The assembly formed by the gimbal 8, the die 25, and the R/W transducer 6 has a more compact structure than conventional solutions having the die 25 interposed between the gimbal 8 and the R/W transducer 6. This is because the embodiment of FIGS. 4–6 saves a thickness equal to the gimbal 8 and to the adhesive material layer between the die 25 and the gimbal 8, and the embodiment of FIGS. 7–8 saves a thickness equal to the mass 42. In addition, an "active gap" (e.g., a distance between the head 10 and the gimbal 8) is reduced by an extent equal to the thickness of the die 25, of two previously necessary glue layers, and for the first embodiment, the depth of the R/W transducer 6 extending inside the central circular hole 41. This greater compactness leads to improved aerodynamics of the assembly, to increased ease and accuracy in controlling a vertical position of the R/W transducer 6 with respect to the hard disk 7 to be read/written, and thus to less possible impacts of the R/W transducer 6 against the hard disk 7 and to an increase in durability of both.

Finally, it is apparent that many changes and variants can be made to the assembly method and to the R/W transducer-microactuator-gimbal assembly described and illustrated herein, all of which come within the scope of the invention, as defined in the attached claims. For example, in the first embodiment, as an alternative to the method described, the semiconductor material wafer can be cut into individual dices before gluing the R/W transducer 6 to a respective die 25, and/or the mass 42 and the strip 40 can be cured simultaneously. In addition, in the first embodiment, the strip 40 can be formed simultaneously when depositing the mass 42, instead of in different steps. In the second embodiment, according to FIGS. 7 and 8, the electrical connection regions 28 can be formed in the same manner as for the first embodiment shown in FIGS. 4–6 and 6a. As an alternative, in both embodiments, the electrical connection regions 28 can comprise structures extending on the gimbal 8 and having sufficient resilience to allow a rotation of the R/W transducer 6 during actuation. In addition, the method of connecting the R/W transducer to the rotor 11 of the microactuator 9 can vary. For example, instead of being glued, the R/W transducer 6 can be soldered. Similarly, the strip 40 can be a different material than the above-described adhesive material.

These and other changes can be made to the invention in light of the above detailed description. In general, in the following claims, the terms used should not be used to limit the invention to the specific embodiments disclosed in the specification and the claims, but should be construed to include all methods that operate under the claims for assembling an actuator device, as well as the actuator device obtained using the method. Accordingly, the invention is not limited by the disclosure, but instead the scope of the invention is to be determined entirely by the following claims, which are to be construed in accordance with established doctrines of claim interpretation.

What is claimed is:

1. An actuator device for a hard disk, comprising:
    a read/write (R/W) transducer;
    a microactuator;
    a suspension plate having a first face and a second face opposed to said first face, wherein said microactuator is connected to said first face of said suspension plate and said R/W transducer projects from said microactuator to a position beyond said second face of said suspension plate; and
    a fixing strip extending between a body accommodating said microactuator and said suspension plate, wherein said fixing strip externally surrounds said microactuator and seals the microactuator between the body and the suspension plate.

2. The device according to claim 1 wherein said suspension plate is arranged between said microactuator and said R/W transducer, and is formed with a through-hole accommodating a connection structure between said microactuator and said R/W transducer.

3. The device according to claim 2 wherein said connection structure comprises a fixing mass arranged between a movable region of said microactuator and said R/W transducer and wherein said through-hole has larger dimensions than said fixing mass and smaller dimensions than an area of said R/W transducer.

4. An actuator device for a hard disk, comprising:

a read/write (R/W) transducer;

a microactuator; and a suspension plate having a first face and a second face opposed to said first face, wherein said microactuator is connected to said first face of said suspension plate and said R/W transducer projects beyond said second face of said suspension plate, wherein said suspension plate is formed with a through-hole having larger dimensions than said R/W transducer and wherein said R/W transducer is rigidly connected to said microactuator and extends partially in said through-hole.

5. The device according to claim 4 wherein said R/W transducer is rigidly connected to a movable structure of said microactuator by a fixing mass.

6. The device according to claim 4, further comprising suspended electrical connection regions extending above a body accommodating said microactuator, and facing said first face of said suspension plate, wherein said electrical connection regions are electrically connected to contact pads of said R/W transducer, wherein said contact pads are arranged near said through-hole and conductive tracks formed on said suspension plate.

7. The device according to claim 6 wherein said suspension plate comprises:

a support layer;

an intermediate insulating layer; and a conductive layer, wherein said intermediate insulating layer and said conductive layer are selectively removed to form electrical connection regions extending substantially coplanar to said second face of said suspension plate, wherein said electrical connection regions are electrically connected to contact pads of said R/W transducer, and wherein said contact pads are arranged near said second face of said suspension plate and conductive tracks formed on said suspension plate.

8. The device according to claim 5 wherein said fixing mass and said fixing strip comprise a polymer material curable by ultraviolet (UV) rays or by heat.

9. A system operable to actuate a hard disk, the system comprising:

a motor element;

a suspension coupled to the motor element and movable across the hard disk in response to the motor element, wherein the suspension includes a gimbal having first and second faces;

an actuator device including a microactuator connected to the first face of the gimbal and a transducer connected to the microactuator and projecting from a position on a plane adjacent to the first face of the gimbal to a position beyond the second face of the gimbal; and suspended electrical connections extending above the microactuator, wherein the suspended electrical connections electrically connect contact pads formed on the transducer to conductive tracks formed on the gimbal.

10. The system of claim 9 wherein the gimbal is formed with an aperture between the first and second faces and wherein the aperture is sized such that the transducer extends at least partially through the aperture.

11. The system of claim 9 wherein the gimbal substantially covers a surface of the microactuator to reduce particle contamination of the microactuator or to reduce electrostatic interference between the microactuator and the transducer.

12. A system operable to actuate a hand disk, the system comprising:

a motor element;

a suspension coupled to the motor element and movable across the hard disk in response to the motor element, wherein the suspension includes a gimbal having first and second faces;

an actuator device including a microactuator connected to the first face of the gimbal and a transducer connected to the microactuator and projecting from a position on a plane adjacent to the first face of the gimbal to a position beyond the second face of the gimbal;

a sealing structure of a dielectric material laterally surrounding the microactuator and connecting the microactuator to the first face of the gimbal; and a connection element connecting the transducer to the microactuator.

* * * * *

UNITED STATES PATENT AND TRADEMARK OFFICE
CERTIFICATE OF CORRECTION

PATENT NO.    : 6,501,623 B1
DATED         : December 31, 2002
INVENTOR(S)   : Simone Sassolini et al.

It is certified that error appears in the above-identified patent and that said Letters Patent is hereby corrected as shown below:

<u>Column 8,</u>
Line 25, "a hand disk," should be corrected to read as -- a hard disk, --.

Signed and Sealed this

Thirteenth Day of May, 2003

JAMES E. ROGAN
*Director of the United States Patent and Trademark Office*